UNITED STATES PATENT OFFICE.

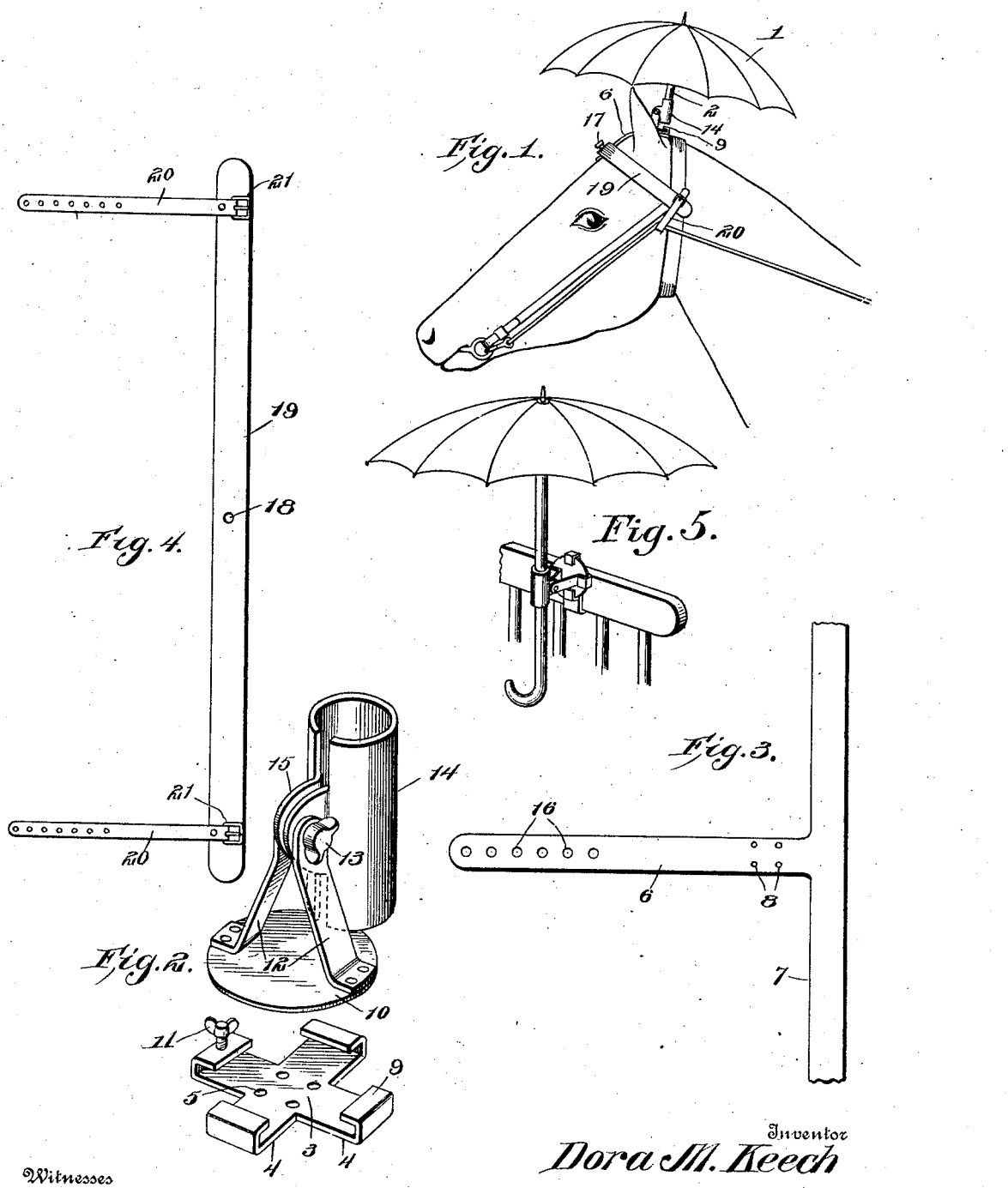

DORA M. KEECH, OF CHICAGO, ILLINOIS.

SUNSHADE OR UMBRELLA SUPPORT.

No. 846,315.      Specification of Letters Patent.      Patented March 5, 1907.

Application filed February 7, 1906. Serial No. 299,971.

*To all whom it may concern:*

Be it known that I, DORA M. KEECH, a citizen of the United States, residing at Chicago, in the county of Cook and State of Illinois, have invented new and useful Improvements in Sunshade or Umbrella Supports, of which the following is a specification.

This invention relates to sunshade or umbrella supports, the object of the invention being to provide means attachable to an ordinary bridle for supporting a sunshade over the head of the animal and providing for the adjustment of such sunshade to any desired angle, so as to form an effective protector for the head of the animal at any time of the day in whichever direction the sun's rays are descending, the sunshade being held in such manner as not to interfere with the animal's ears and to afford a free circulation of air beneath the shade. Furthermore, the sunshade, with its staff, is removable from the attachment when not needed, the remainder of the attachment not impairing the appearance of the bridle to any noticeable extent.

With the above and other objects in view the invention consists in the novel construction, combination, and arrangement of parts hereinafter more fully described, illustrated, and claimed.

In the accompanying drawings, Figure 1 is a side elevation of the device, on a small scale, shown in its applied position. Fig. 2 is an enlarged detail perspective view of the attachment with the securing-straps omitted. Fig. 3 is a plan view showing the center strap and a portion of the cheek-strap. Fig. 4 is a plan view of the head-strap. Fig. 5 is a perspective view showing the device used in connection with the back of a seat or chair.

In carrying out the present invention I employ a sunshade or umbrella 1 of any desired size, provided with a staff or stick 2 of any suitable length to support the shade at the desired elevation above the head of the animal in the manner shown in Fig. 1.

The supporting and adjusting device for the staff embodies, essentially, a base 3, preferably of cruciform shape, or provided with a series of arms 4, radiating from a common center, the central portion being provided with a plurality of holes 5 to receive rivets, by means of which said base is secured to a center strap 6, extending forward between the ears of the animal from a crown-strap 7, the center strap being provided with holes 8 to receive the rivets passing through the center portion of the base 3, whereby the base is firmly secured to the center strap close up to the junction of said center strap with the crown-strap 7. The outer ends of the arms 4 are bent upward and inward to form retaining flanges or lips 9, beneath which is arranged a disk or turn-table 10, which is thus free to revolve upon the base and beneath the retaining-lips 9, except when it is held in any adjusted position by means of a binding-screw 11, passing through one of the lips 9 and adapted to bear against the top of the turn-table 10. Extending upward from the turn-table are standards 12, and passing through the upper end of said standards is a clamping bolt or screw 13.

14 designates a spring-sleeve of proper size to receive the staff or stick 2 of the sunshade, the said sleeve being provided at its open side with parallel lugs or ears 15, which fit between the standards 12 and receive the clamping-bolt 13. By tightening the clamping-bolt 13 the sleeve 14 is drawn tightly around the staff or stick of the sunshade, so as to securely hold the same in place, and by loosening said clamping-bolt the staff of the sunshade may be released and the sunshade as a whole removed, folded, and put away. The combined crown and center strap 6 and 7 is preferably formed of metal, the strap 7 being secured to the cheek-strap of the bridle, while the center strap 6 is provided with a series of holes 16, adapted to receive a fastening device 17, which also passes through a hole 18 in a head-strap 19, also preferably of metal and fitting over the forepiece of the bridle, the ends of the straps 19 being provided with securing-straps 20 and buckles 21, by means of which said ends of the head-strap may be secured to keepers on the bridle.

By means of the construction above described the base 3 and the parts connected therewith are securely fastened to the bridle, so as to form an efficient support for the sunshade above the head of the animal, the staff-holding device being small, so as not to impair the appearance of the bridle when the sunshade and its staff are removed.

By reference to Fig. 5 it will be seen that the invention is also applicable to the backs of the seats of various vehicles—such as automobiles, buggies, and wagons—and also to chairs. In adapting the device to this last-named use the base 3 is provided with a clip 23, secured to the bottom of the base and adapted to embrace a portion of said seat and anchor the device as a whole thereto, as shown in said Fig. 5.

I claim—

1. A sunshade-holder comprising a base provided with inturned retaining lips or flanges, a turn-table mounted on the base and engaged beneath said retaining lips or flanges, standards extending upward from the turn-table, a sunshade-staff-holding sleeve connected pivotally to said standards, clamping means for confining the sleeve about the staff, and means for fastening the turn-table to prevent rotation thereof.

2. An umbrella or sunshade support comprising a base provided with inturned retaining lips or flanges, one of which carries a binding-screw, attaching means for said base, a turn-table mounted on the base and working beneath said retaining lips or flanges and adapted to be engaged by said binding-screw, standards extending upward from the turn-table, a staff-holding sleeve connected pivotally to said standards, and a clamping-bolt for confining the sleeve about the staff.

In testimony whereof I affix my signature in presence of two witnesses.

DORA M. KEECH.

Witnesses:
   CHAS. E. SHELDON,
   HERMAN VANDER HACK.